Oct. 23, 1923.  
M. O. JOHNSON ET AL  
1,471,336  
PINEAPPLE TRIMMING MACHINE  
Filed Jan. 26, 1921  3 Sheets-Sheet 1
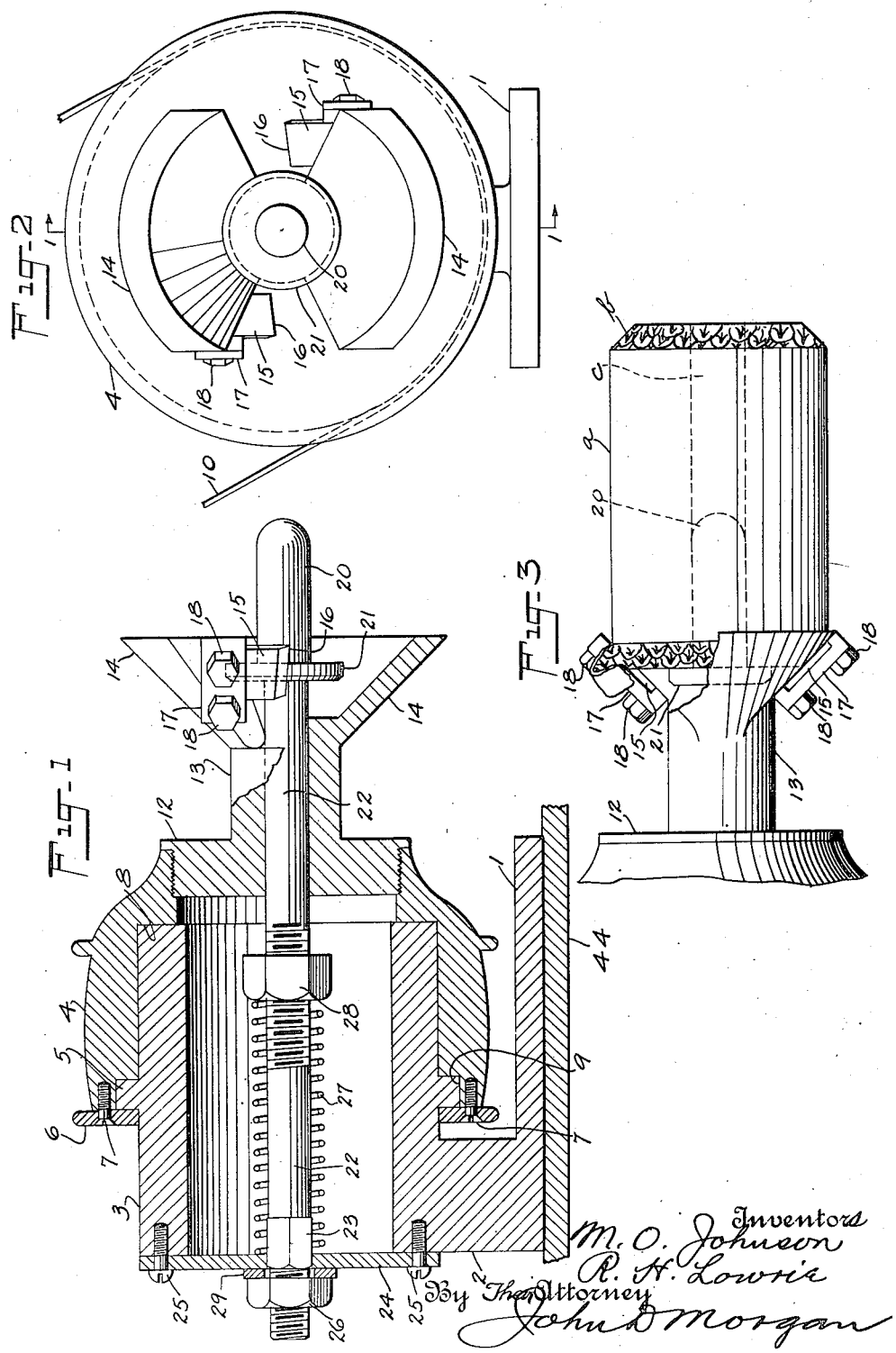

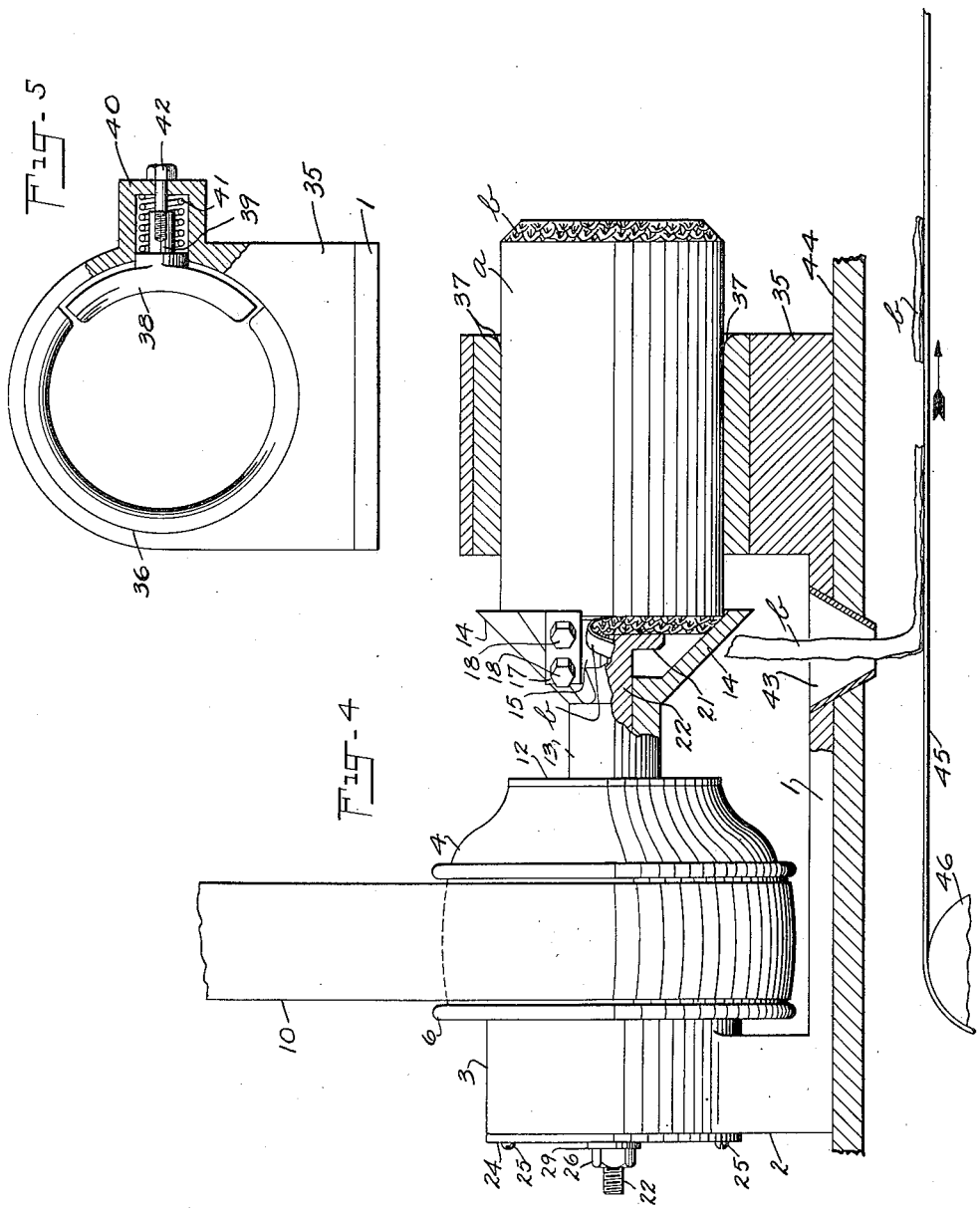

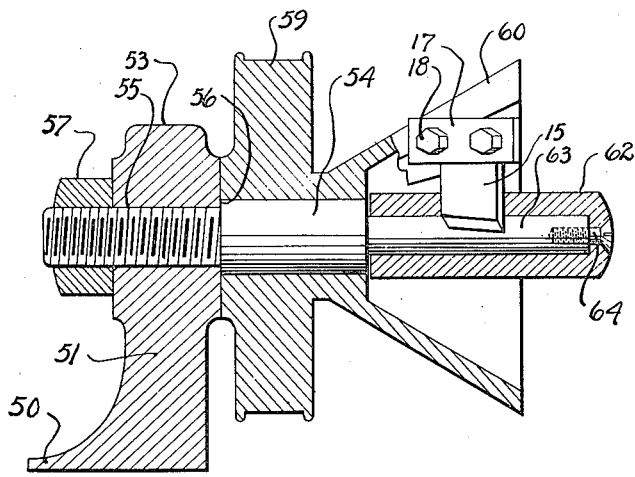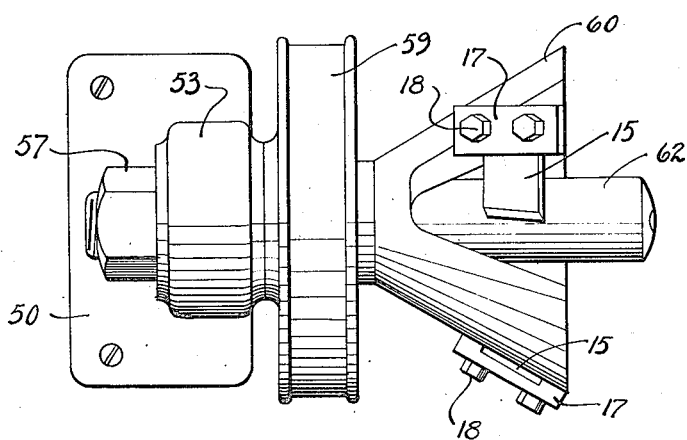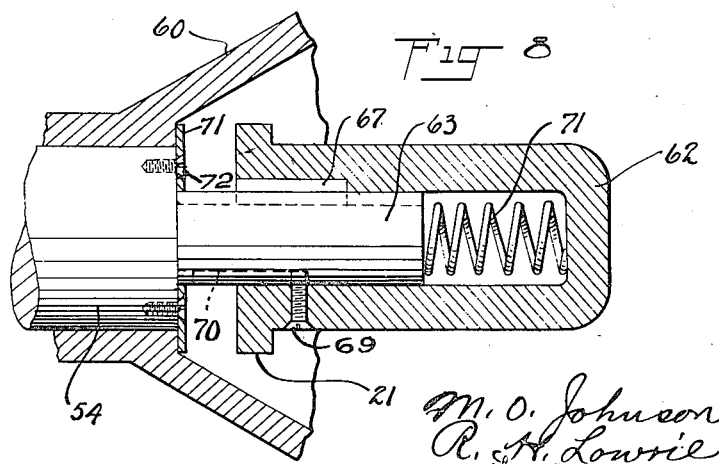

Patented Oct. 23, 1923.

1,471,336

UNITED STATES PATENT OFFICE.

MAXWELL O. JOHNSON, OF WAIPIO, AND ROBERT H. LOWRIE, OF HONOLULU, TERRITORY OF HAWAII.

PINEAPPLE-TRIMMING MACHINE.

Application filed January 26, 1921. Serial No. 440,108.

*To all whom it may concern:*

Be it known that we, MAXWELL O. JOHNSON and ROBERT H. LOWRIE, citizens of the United States, residing, respectively, at Waipio, in the county of Honolulu and Territory of Hawaii, and at Honolulu, in the county of Honolulu and Territory of Hawaii, have made certain new and useful Improvements in Pineapple-Trimming Machines, of which the following is a specification.

The invention relates to a machine for removing the skin or rind from pineapples, and more especially to a machine for peeling the annular strips of rind or eyes from the ends of sized and cored pineapples. preparatory to slicing and canning.

Objects and advantages of the invention will be set forth in part hereinafter and in part will be obvious herefrom, or may be ascertained through use of the invention; the same being realized and attained by and through the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a central, vertical longitudinal section through a machine embodying the invention, taken on line 1—1 of Fig. 2;

Fig. 2 is a full end elevation, looking at Fig. 1 from the right;

Fig. 3 is a fragmentary elevation, corresponding to the right-hand end of Fig. 1, and showing one manner of holding the fruit and the peeling action;

Fig. 4 is a front elevation of the machine, but showing in section a different form of fruit holding means;

Fig. 5 is an end elevation, looking at Fig. 4 from the right, with parts in section;

Fig. 6 is a central vertical section through a somewhat simplified form of the machine;

Fig. 7 is a front elevation corresponding to Fig. 6; and

Fig. 8 is a fragmentary detail of a modification of the fruit holder.

In modern factories for canning pineapples, the central portion of the fruit is cut out longitudinally thereof in cylindrical form by a machine, and of a size to fit snugly within the cans in which it is packed for commerce. This operation is styled "shaping." The tops and bottoms of these cylinders are cut off to remove the irregularly shaped, peel-covered ends.

Usually simultaneously with the shaping, a cylindrical core is cut out centrally and longitudinally of the cylinder, this portion of the fruit being non-edible or at least very inferior. This operation is called "coring."

To avoid waste and to have the cylinders of fruit as long as possible, the top and bottom thereof are cut off in as thin a slice as possible. This leaves at each end of the cylinder of fruit a diagonally disposed or somewhat rounded rim of rind or eyes which it is necessary to remove before slicing and canning the shaped and cored fruit. By this manner of working, practically two additional slices are saved, or added, for canning from each cylinder of fruit.

Up to the present time, these annular strips of rind or eyes left on the ends of the cylinders of pineapple have been trimmed or peeled off by hand labor at the trimming tables, before the fruit passes on to the slicing machines, to be sliced into the circular discs preparatory to canning. This hand work is slow and wasteful, as one trimmer can handle only two or three pineapples per minute, and careless trimming removes a great deal of the usable and valuable part of the fruit. With the present invention, one workman can trim twenty or more pineapples per minute.

The present invention provides a machine especially capacitated to receive the "shaped," and preferably "cored" pineapple and to quickly, efficiently and economically remove the strips of rind or eyes from the ends of the cylinders, and at the same time to guard against wastage of the fruit in the peeling operation.

Referring now in detail to the accompanying drawings, which illustrate by way of example the present preferred embodiment of the invention, and referring for the present to Figs. 1 to 3, means are provided for holding the shaped and cored fruit by engagement with the central core aperture of the fruit.

In accordance with one feature of the invention, the fruit holding spindle engages within the core opening with sufficient friction or tightness to hold the fruit from rotating, this feature being preferably employed with that of the rotating knife or knives for effecting the peeling.

Said embodied means comprises also a peeling knife or knives set at an angle to the fruit supporting spindle and rotating thereabout to effect the peeling action.

Referring now more in detail to the accompanying drawings, illustrating by way of example one embodiment of the invention, the machine is provided with a base 1 from which projects upwardly a standard 2 terminating in a hollow, internally and externally cylindrically-shaped support 3. Rotatably mounted upon the exterior of the support 3 is a belt pulley 4, which constitutes in the exemplified embodiment the driving means for the device.

The support 3 has on its exterior surface an exteriorly-projecting, annular flange 5 fitting into a correspondingly shaped recess or annular groove or shoulder 9, in the interior of the pulley member 4. An annular flange 6 fits against the end of the pulley 4 and against the exterior side of the annular flange 5, and is fastened in suitable manner, as by screws 7, to the pulley, thereby holding the pulley in position upon the support 3. The pulley 4, as embodied, extends past the end of the support 3 and has an inwardly-projecting, annular shoulder 8, fitting over the end of the support 3, to assist in the smooth and easy running of the device. A belt 10 may be used as the driving means for pulley 4.

In the embodied form, the peeling knife or knives have rotary movement, and as embodied they are fixed to, supported by, and rotate with, the pulley 4. For this purpose, a circular disc or head 12 is screw-threaded into the open end of the pulley 4, and a neck 13 is integral with, and projects outwardly from, the disc 12 and carries the knife supports 14, preferably two in number.

The knife or knives are arranged nearly tangentially to the sized fruit as supported on the machine, and at an angle to the axis of rotation. The knife supports are constructed and arranged to present the knives at an angle to most efficiently and economically peel the remaining rind from the sized fruit, and as shown herein, they are placed substantially at an angle of forty-five degrees, although it will be understood that this angle may be varied as found convenient or desirable to effect the efficient and economical peeling action already referred to.

The knife supports 14, as embodied are preferably integral with the structure already described, and are approximately in the form of sectors of a hollow cone, with their sides cut away so as to present the knives in proper position for the peeling action as shown in Figs. 3 and 4. The knife or knives 15 present their cutting edges 16 in the desired definite position with respect to the fruit, but the knives are adjustable in their supports. The embodied form of support therefor comprises recessed clamps 17, embracing or straddling the knives, and they are held in position upon the holders 14 by screw bolts 18. The supports 14 also constitute guides or stops which prevent the knives from cutting too deeply into and wasting the fruit.

In the embodied form, and in connection with the rotating knives, the fruit is preferably held in stationary position during the peeling. In Figs. 1, 2 and 3, the present preferred form of mechanism for operating upon sized and cored pineapples is shown. As so embodied, a fruit supporting spindle 20 is located within and projects outwardly past the knife holders 14, and is preferably of a size for engaging friction tight within the core aperture $c$, which extends centrally and longitudinally of the fruit. By this frictional engagement, the fruit is supported and also held against any tendency toward rotation due to the action of the rotating knives.

Mounted on the spindle 20 is a stop 21, to limit or position the fruit longitudinally upon the spindle. Spindle 20 is provided with a fixed shaft 22, supported within and extending backwardly through the neck 3, and provided with a squared or otherwise angular end 23, which passes through, is supported in, and held from rotation by, a plate 24. Plate 24 is fastened to the outer end of the support 3 in suitable manner, as by screws 25. A nut 26 is screw-threaded on the exterior end of the shaft 22 to hold the spindle 20 in position, while permitting any desired endwise adjustment thereof.

Means are provided for manually regulating the depth of cut, said means operating against resilient pressure, it having been found by experience, that this effects a more economical peeling of the fruit. In the embodied form thereof, a helical spring 27 is coiled about shaft 22, within the support 3, in compression between the plate 24 and a nut 28 screw-threaded on shaft 22, the nut thereby affording adjustment for the tension of the spring 27. A washer 29 may be employed to permit any desired movement of the squared end 23 of the shaft in the opposite direction through the plate 24.

With the mechanism just described, the sized fruit $a$ is positioned on the machine by the spindle 20 passing friction tight within the core aperture $c$, and the operator then presses the fruit, by hand, slightly to the left in Figs. 1 and 3 against spring 27, and the revolving knives 15 will peel away the strip of rind or eyes b. As soon as the rind is completely peeled, the hand pressure is removed, and further wasteful peeling of the fruit is avoided. Thus by the hand regulation, the operator may insure quick and complete peeling or trimming while avoiding subsequent wastage of the fruit. If desired, the fruit may be held by hand against rotation, and the spindle 20 need not be friction tight, although the friction fit for the spindle is preferred.

In Figs. 4 and 5, a different form of fruit support is provided, which is adapted to support the sized fruit exteriorly, whether the fruit be cored or not. In said form, a standard 35 projects upwardly from the base 1, and is provided with a ring 36, having an internal diameter, substantially the same as that of the sized fruit a. While the fruit may be pushed friction tight into this ring, the rounded end 37 assisting in this, there is preferably provided one or more yielding or spring-pressed segments 38, designed to hold the fruit snugly and prevent its rotating. As shown the segment 38 is provided with stems 39 along its length, which project into casings or housings 40 formed on the standard 35, and are encircled by compression springs 41, and are provided with tension-regulating screws 42.

The stop 21 and shaft 22 may be employed as a resilient stop for the fruit, the peeling being regulated by hand in the manner already described, if desired. The support 36 also may receive the shaped fruit loosely and it may be held against rotation by hand, if desired, although the friction fit is preferred.

Means are provided, if desired, for automatically conveying away the peelings from a battery of the machines, and such an arrangement is shown in Fig. 4. Openings or chutes 43 are provided in the table 44, upon which the machines are mounted. The chutes 43 discharge the peeling from the machines upon a conveyor belt 45, suitably driven, and running on rollers 46, and extending beneath the table 44 past the various machines to receive the peelings therefrom.

In Figs. 6 and 7 are shown a somewhat simplified embodiment of the invention, which is designed with a view especially to simplicity and compactness, and which has been found satisfactory and efficient in practical commercial work under ordinary factory conditions. In said embodiment, a base 50 is adapted to stand upon and to be fastened to a table or other suitable support. Extending upwardly from the base 50 is a standard 51 terminating at its upper end in a supporting boss or head 53 for the operative parts of the machine.

A stationary shaft 54 has its base or rear end screw-threaded into a threaded opening 55 in the head 53 and has a shoulder 56 fitting against the face of head 53. The rear screw-threaded end of shaft 54 projects from the rear of the head 53 and a lock nut 57 is screwed thereon.

In this form the fruit core is stationary and the peeling knives rotate. Mounted loosely for rotation upon shaft 54 is a driving pulley 59 and rotating with, and preferably constructed integral with, the pulley is a knife holder 60, which is shown of the same general form as knife holder 14 already described. The peeling knives and their mounting may be the same or generally similar to those shown in the preceding figures, and the same reference numerals are applied thereto. In the present figures, the knives 15 are shown disposed at an angle of approximately thirty degrees to the axis of the fruit-supporting spindle, this having been found in practice to be one very efficient position for the knives. As heretofore stated, however, the knives may be arranged at any desired or convenient angle.

In this instance, as already indicated, the fruit is held stationary by means of a spindle 62 engaging frictionally within the core aperture in the fruit, in the manner previously described. The fruit-supporting spindle 62 is preferably formed as a hollow cylinder, with its outer end closed, fitting over the front end 63 of the shaft 54, which end is preferably of less diameter than the main portion of the shaft. To hold spindle 62 against rotation, it is apertured in its outer end to receive a screw 64, which is screwed into the end 63 of shaft 54, the head of the screw being countersunk in the end of hollow spindle 62. It will be understood that spindle 62 could be provided with a stop 21 such as is shown on spindle 20.

The manner of operation is substantially the same as has been already described in connection with Figs. 1 and 2 and need not be repeated.

In Fig. 8 the yielding spring feeding action is shown applied to the form of mechanism shown in Figs. 6 and 7. In Fig. 8 the spindle 62 is shown having a feather 67 working in a slot 68 in shaft 63, whereby the spindle is movable along but not around the stationary shaft 63. A stop screw 69 carried in spindle 62 works in a longitudinally disposed slot 70 in shaft 63, to prevent the spindle being pulled off the shaft. A spring 71 is coiled in compression within the hollow spindle 62 and between the end of the spindle and the end of shaft 63. This spring acts in the same manner as spring 27 to regulate the peeling by hand pressure, as already described. A washer 71 held to shaft 54 by screws 72 holds the pulley and cutters in position on the shaft.

It will be understood that the various modified forms shown and described are illustrative of the invention in various preferred embodiments, but are not in any wise restrictive of the invention.

The invention in its broader aspects is not limited to the specific mechanisms shown and described but departures may be made therefrom within the scope of the accompanying claims without departing from the principles of the invention and without sacrificing its chief advantages.

What we claim is:—

1. A machine for trimming sized pineapples including in combination means for supporting a sized and cored pineapple including a member projecting into the core opening, a knife for diagonally trimming the end of the shaped pineapple, and means for effecting relative rotary motion between the knife and the shaped pineapple.

2. A machine for trimming sized pineapples including in combination holding means entering the core opening of a sized and cored pineapple, a knife for diagonally trimming the end of the shaped pineapple, and means for effecting relative rotary motion between the knife and the shaped pineapple.

3. A machine for trimming sized pineapples including in combination a knife for diagonally trimming the end of a shaped pineapple, and means frictionally engaging within the core opening of the shaped pineapple to hold it fixed relatively to said engaging means, and means for effecting relative movement between the knife and pineapple.

4. A machine for trimming sized pineapples including in combination a rotating knife for diagonally trimming the end of a shaped pineapple, and non-rotating means frictionally engaging within the core opening of the shaped pineapple to hold it fixed relatively to said engaging means.

5. A machine for trimming sized pineapples including in combination means for supporting at its flat end a sized and cored pineapple including a member projecting into the core opening, a knife for diagonally trimming the end of the shaped pineapple, and means for effecting relative rotary motion between the knife and the shaped pineapple.

6. A machine for trimming sized pineapples including in combination a support for a sized and cored pineapple entering the core opening at one end, a knife for diagonally trimming the end of the sized pineapple, and means for effecting relative rotary movement between the pineapple and knife.

7. A machine for trimming sized pineapples including in combination a support for a sized and cored pineapple entering the core opening at one end to hold the pineapple against rotation, a knife for diagonally trimming the end of the sized pineapple, and means for rotating the knife about the pineapple.

8. A machine for trimming sized pineapples including in combination means for supporting a sized pineapple, a knife for diagonally trimming the end of the shaped pineapple, means for effecting relative rotary motion between the knife and the shaped pineapple, and resiliently resisting means whereby the sized pineapple and knife may be relatively moved longitudinally to control the depth of cut of the knife.

9. A machine for trimming sized pineapples including in combination means for supporting a sized pineapple, a knife for diagonally trimming the end of the shaped pineapple, means for effecting relative rotary motion between the knife and the shaped pineapple, and resiliently resisting means whereby the sized pineapple may be moved longitudinally relatively to the knife to control the depth of cut.

10. A machine for trimming sized pineapples including in combination means for supporting a sized pineapple, a knife for diagonally trimming the end of the shaped pineapple, means for effecting relative rotary motion between the knife and the shaped pineapple, spring resistance means, and means whereby the sized pineapple and knife may be relatively moved longitudinally against said spring resistance to control the depth of cut of the knife.

11. A machine for trimming sized pineapples including in combination means for supporting a sized pineapple, a knife for diagonally trimming the end of the shaped pineapple, means for effecting relative rotary motion between the knife and the shaped pineapple, spring resistance means, and means whereby the sized pineapple may be moved against said spring resistance longitudinally relatively to the knife to control the depth of cut.

12. A machine for trimming sized pineapples including in combination means for supporting a sized pineapple, a knife for diagonally trimming the end of the shaped pineapple, means for effecting relative rotary motion between the knife and the shaped pineapple, means whereby the sized pineapple and knife may be relatively moved longitudinally to control the depth of cut of the knife, and means for limiting said longitudinal movement of the pineapple.

13. A machine for trimming sized pineapples including in combination means for supporting a sized pineapple, a knife for diagonally trimming the end of the shaped pineapple, means for effecting relative rotary motion between the knife and the shaped pineapple, means whereby the sized pineapple may be moved longitudinally relatively to the knife to control the depth of cut, and means for limiting said longitudinal movement of the pineapple.

14. A machine for trimming sized pineapples including in combination means for supporting a sized pineapple, a knife for diagonally trimming the end of the shaped pineapple, means for effecting relative rotary motion between the knife and the shaped pineapple, spring resistance means, means whereby the sized pineapple and knife may be relatively moved longitudinally against said spring resistance to control the depth of cut of the knife, and means for limiting said longitudinal movement of the pineapple.

15. A machine for trimming sized pineapples including in combination means for supporting a sized pineapple, a knife for diagonally trimming the end of the shaped pineapple, means for effecting relative rotary motion between the knife and the shaped pineapple, spring resistance means, means whereby the sized pineapple may be moved against said spring resistance longitudinally relatively to the knife to control the depth of cut, and means for limiting said longitudinal movement of the pineapple.

16. A machine for trimming sized pineapples including in combination a frame, a shaft fixedly supported on said frame, a rotary driving member and a peeling knife mounted on said shaft to rotate together, and a fixed support for the fruit mounted on said shaft.

17. A machine for trimming sized pineapples including in combination a frame, a shaft fixedly supported in said frame, an integral pulley and peeling knife support rotatably mounted on said shaft, and a fixed fruit support carried by the shaft adjacent to the peeling knife.

18. A machine for trimming sized pineapples including in combination a frame, a fixed shaft screw-threaded into the frame, a lock nut screw-threaded on the shaft, an integral pulley and conoidal knife support rotatable on the shaft, a peeling knife on the support, and a fixed fruit support on the shaft within the conoidal knife support.

19. A machine for trimming sized pineapples including in combination means engaging with its flat end to support a sized pineapple, a knife for diagonally trimming the end of the shaped pineapple, and means for effecting relative rotary motion between the knife and the shaped pineapple.

20. A machine for trimming sized pineapples including in combination means for supporting a sized pineapple, a knife for diagonally trimming the end of the shaped pineapple, means for effecting relative rotary motion between the knife and the shaped pineapple, and means whereby the sized pineapple may be moved longitudinally relatively to its support and to the knife to control the depth of cut.

21. A machine for trimming sized pineapples including in combination a spindle for holding a cored pineapple by frictionally fitting within the core opening, a rind peeling knife, and means for effecting rotary relative movement between the knife and the pineapple.

22. A machine for trimming sized pineapples including in combination a spindle for holding a cored pineapple against rotating by fitting frictionally within the previously formed core opening, and a rotating rind-peeling knife.

23. A machine for trimming sized pineapples including in combination means having only slight resilient longitudinal movement for supporting a sized pineapple, a knife for diagonally trimming the end of the shaped pineapple, and means for effecting relative rotary motion between the knife and the shaped pineapple.

24. A machine for trimming sized pineapples including in combination means for supporting a sized pineapple including a resilient device permitting relative movement between the pineapple and the support, a knife for diagonally trimming the end of the shaped pineapple, and means for effecting relative rotary motion between the knife and the shaped pineapple.

25. A machine for trimming sized pineapples including in combination means for supporting a sized pineapple including a resilient device permitting relative movement between the pineapple and the support, a knife rotatable about the supported pineapple for diagonally trimming the end of the shaped pineapple.

26. A machine for trimming sized pineapples including in combination means for supporting a shaped pineapple in substantially fixed longitudinal position, a diagonally disposed knife spaced away from said support to peel diagonally only the out edge portions at the juncture of the flat and cylindrical parts of the shaped pineapple, and means for effecting relative rotary movement between the knife and the support.

27. In a pineapple trimmer, a frame, a shaft rotatably mounted therein and a trimming device supported on the shaft comprising a cup having a plurality of blades mounted interiorly, the shaft extending through the bottom of the cup and being adapted to engage the core of the pineapple for steadying the same.

28. In a pineapple trimmer, a frame, a shaft rotatably mounted therein, and a trimming device supported on the shaft comprising a disc having an outer flange presenting an inner conical surface and a plurality of blades mounted in said flange, the shaft extending through the disc and being adapted to engage the core of the pineapple for steadying the same.

29. In a pineapple trimmer, a frame, a shaft rotatably mounted therein, and a trimming device supported on the shaft comprising a disc having an outer flange presenting an inner conical surface and a plurality of blades mounted in said flange, the shaft extending through the disc and having a tapered end adapted to be received by the core of the pineapple and to guide the same.

In testimony whereof we have signed our names to this specification, in the presence of two subscribing witnesses.

MAXWELL O. JOHNSON.
ROBERT H. LOWRIE.

Witnesses:
JAMES WAKEFIELD,
CECIL G. BENNY.